March 9, 1926.

W. H. JENKINS

FEED BOX

Filed Dec. 10, 1923

William H. Jenkins
INVENTOR

BY Victor J. Evans
ATTORNEY

WITNESS:

March 9, 1926.
W. H. JENKINS
FEED BOX
Filed Dec. 10, 1923
1,575,629
2 Sheets-Sheet 2
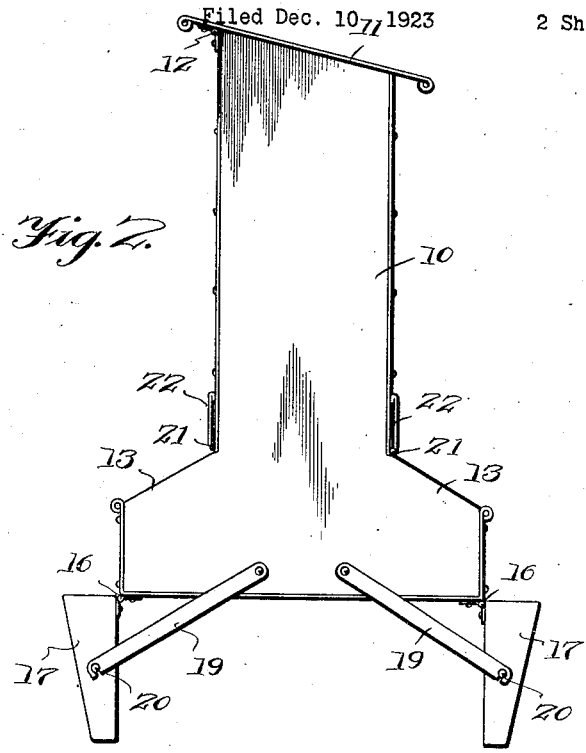
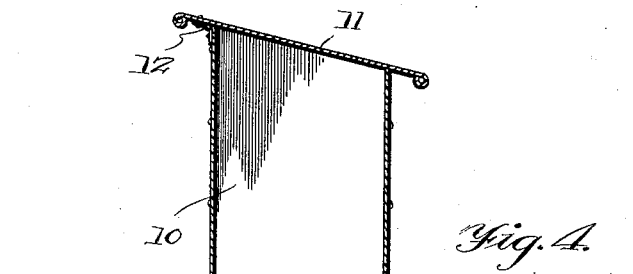
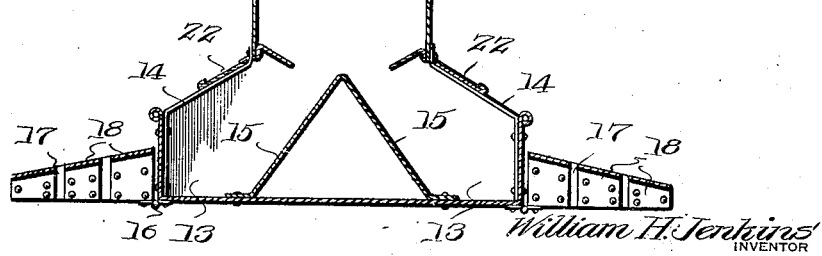
William H. Jenkins
INVENTOR
BY Victor J. Evans
ATTORNEY Patented Mar. 9, 1926.

1,575,629

UNITED STATES PATENT OFFICE.

WILLIAM H. JENKINS, OF DETROIAL PARK, MICHIGAN.

FEED BOX.

Application filed December 10, 1923. Serial No. 679,742.

*To all whom it may concern:*

Be it known that I, WILLIAM H. JENKINS, a citizen of the United States, residing at Detroial Park, in the county of Oakland and State of Michigan, have invented new and useful Improvements in Feed Boxes, of which the following is a specification.

This invention relates to improvements in feed troughs especially adapted for poultry feeding, an object being to provide a trough which may be adjusted for the feeding of either small or large chickens.

Another object of the invention is the provision of a trough for this purpose which is simple in construction and may be easily and quickly arranged for the purpose desired.

With the above and other objects in view, the invention further includes the following novel features and details of construction, to be hereinafter more fully described, illustrated in the accompanying drawings and pointed out in the appended claim.

In the drawings:—

Figure 2 is an end view of the same.

Figure 4 is a transverse section showing the trough arranged for feeding small chickens.

Figures 1, 3:
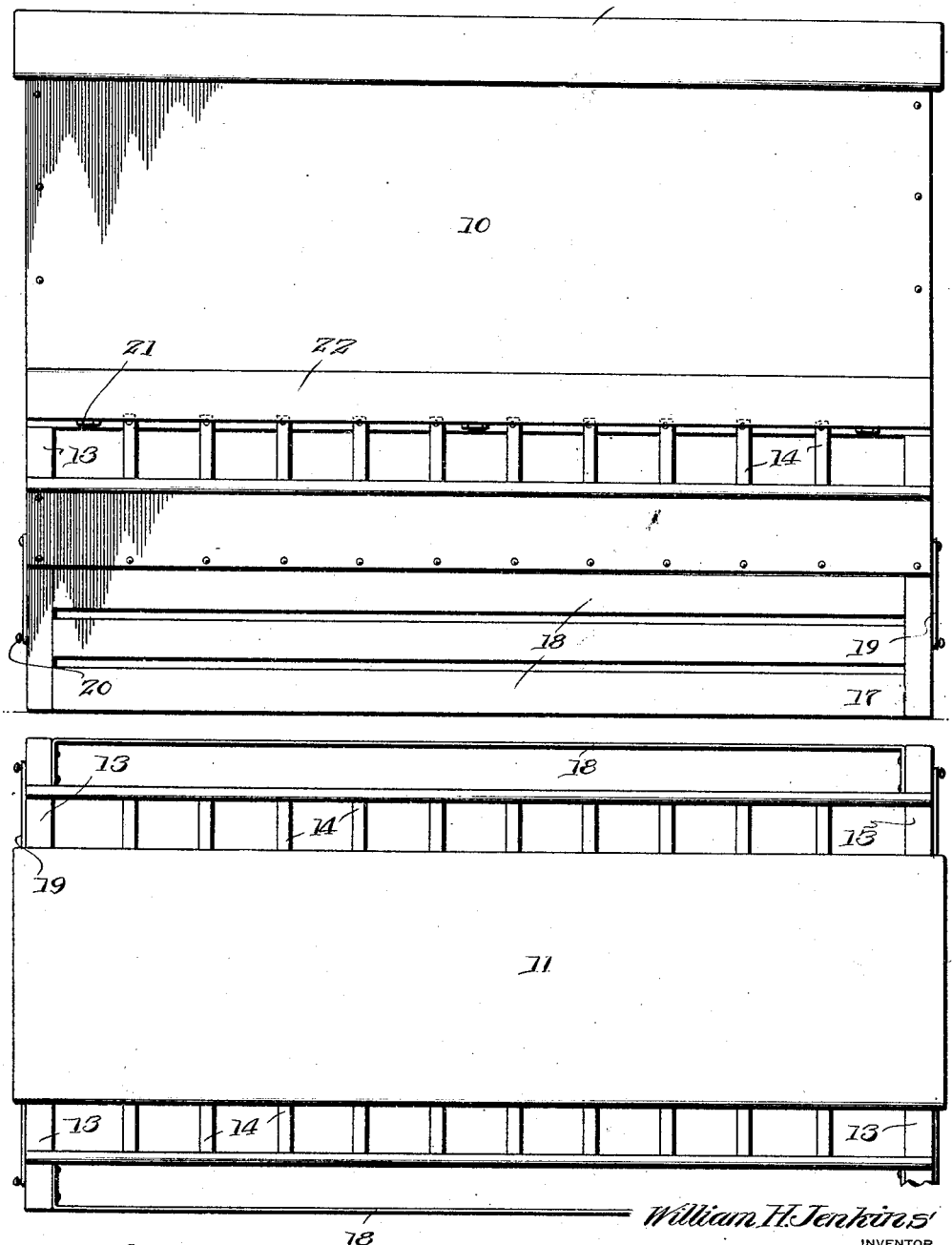
Figure 1 is a front elevation of a feed trough constructed in accordance with the invention, the trough being arranged for feeding large chickens.
Figure 3 is a top plan view.

Referring in detail to the drawings wherein like characters of reference denote corresponding parts, the invention as shown comprises a hopper 10 which is designed to contain a quantity of feed. This hopper is open at the top and is closed by an inclined lid or cover 11 which is hingedly secured in position as shown at 12.

The bottom of the hopper is relatively wide and extends for an appreciable distance upon each side as shown at 13, these extensions being open at the top to provide a feed trough. The open top of the feed trough is provided with spaced parallel rods or bars 14 which divide the troughs into separate feeding spaces so that undue crowding is prevented. The feed is directed from the hopper into the trough by means of oppositely inclined members 15 which extend longitudinally and centrally within the bottom of the hopper.

Hingedly secured to each corner of the base or bottom of the hopper as shown at 16, are supporting legs 17. These legs are connected by spaced longitudinal bars 18 which serve to provide braces for the legs when the latter are in use. The legs are held in position to elevate the feed troughs by means of braces 19. These braces may be of any suitable character and are shown in the form of hooks which are permanently attached to the ends of the hopper and which detachably engage eyes 20 carried by the legs and when so engaged act to hold the legs in upright position so as to properly elevate the troughs for the feeding of large chickens. In addition, the legs 17 and bars 18 provide platforms in front of each of the feeding troughs, so that young chickens may reach the open top of the troughs.

In order to restrict the open tops of the troughs when the invention is used for feeding small chickens, there is hingedly secured to each side of the hopper immediately above the troughs as shown at 21, bars 22. These bars are designed to be raised against the sides of the hopper when the invention is used for feeding large chickens and swung downward along the tops of the troughs as shown in Figure 4 when the invention is used for feeding small chickens. This prevents the smaller chickens from falling within the open tops of the troughs and acts to keep the feed therein in a clean and sanitary condition.

The invention is susceptible of various changes in its form, proportions and minor details of construction and the right is herein reserved to make such changes as properly fall within the scope of the appended claim.

Having described the invention what is claimed is:—

A poultry feeder of the character described comprising a hopper including a relatively narrow upper portion and a relatively wide outwardly and downwardly extending lower portion, longitudinally extending plates hinged to the upper sides of the relatively wide lower portion, a plurality of spaced parallel bars secured to the lower ends of the narrow upper portion and across the width of the lower portion beneath the hinged plates, a pair of substantially wedge shaped legs pivotally secured to the lower and outer sides of the wide lower portion, pairs of braces pivotally secured to the sides of the hopper and adapted to engage and hold the legs at an upright position, a plurality of spaced parallel bars secured to the outer sides of the legs, and a hinged cover arranged upon the top of the hopper.

In testimony whereof I affix my signature.

WILLIAM H. JENKINS.